United States Patent [19]

Jones

[11] 3,917,335
[45] Nov. 4, 1975

[54] FUEL ASSEMBLIES, GRAPPLES THEREFOR AND FUEL TRANSPORT APPARATUS FOR NUCLEAR REACTOR POWER PLANT

[75] Inventor: Cecil R. Jones, Milford, Conn.

[73] Assignee: Transfer Systems Incorporated, North Haven, Conn.

[22] Filed: May 25, 1973

[21] Appl. No.: 363,945

Related U.S. Application Data

[60] Division of Ser. No. 220,751, Jan. 26, 1972, Pat. No. 3,802,996, which is a continuation-in-part of Ser. No. 178,175, Sept. 7, 1971, Pat. No. 3,823,065.

[52] U.S. Cl. .................................. 294/84 A; 294/94
[51] Int. Cl. ............................................... B66c 1/62
[58] Field of Search ............ 294/86 A, 86.24, 86.25, 294/93, 94; 176/30

[56] References Cited
UNITED STATES PATENTS

| | | | |
|---|---|---|---|
| 1,825,025 | 9/1931 | Thomas et al. | 294/86.25 |
| 1,825,026 | 9/1931 | Thomas | 294/86.25 |
| 3,201,166 | 8/1965 | Boutin | 294/94 |

FOREIGN PATENTS OR APPLICATIONS

| | | | |
|---|---|---|---|
| 732,079 | 4/1966 | Canada | 294/86 A |
| 1,900,891 | 8/1970 | Germany | 294/94 |

*Primary Examiner*—Verlin R. Pendegrass

[57] ABSTRACT

A nuclear fuel assembly in which vertically disposed fuel elements are spaced within a housing generally of a rectanguloid configuration. Each fuel element includes an upper end plug and lower end plug. Vertically spaced support plates are disposed in the housing with suitable openings to receive the upper and lower end plugs of the fuel elements for supporting the fuel elements with the housing. The upper plate is removable from the housing and the lower fuel plug is detachably connected to the lower plate. Other spacer plates are secured to the housing walls to reinforce same. A grapple having lifting plates with pins enter recesses formed in the housing for enabling the housing to be raised. After the fuel assembly is raised by the grapple, leaf spring retainers of the upper plate are dislodged for removing the upper plate from the housing. Now, the fuel elements can be removed selectively and individually from the fuel assembly by a removal tool. Aligned with and disposed above the removal tool is a transfer casing for housing the selectively removed fuel element while the selectively removed fuel element is transported to and from a fuel reprocessor.

7 Claims, 12 Drawing Figures

Fig_5

Fig_6

Fig_11

Fig_12

FUEL ASSEMBLIES, GRAPPLES THEREFOR AND FUEL TRANSPORT APPARATUS FOR NUCLEAR REACTOR POWER PLANT

This application is a division of a prior copending application, Ser. No. 220,751, filed Jan. 26, 1972 (now U.S. Pat. No. 3,802,996), which in turn was a continuation-in-part of a prior copending application, Ser. No. 178,175, filed Sept. 7, 1971 (now U.S. Pat. No. 3,823,065).

This invention relates to novel fuel assemblies especially suitable for boiling water reactors for power stations, to novel fuel elements for use in such fuel assemblies, to novel grapples for raising and lowering fuel assemblies in light water reactors, and to fuel transport apparatus.

The fuel elements in conventional boiling water reactors comprise an assembly of thin long rod-like outer tubes of a zirconium alloy filled with fissionable material pellets. During life, such fuel elements can fail due to the formation of pinholes in the outer tubing causing release of radioactive isotopes, or due to rupturing of the tubing causing discharge of the radioactive pellets into reactor water. Prolonged operation after fuel failure can cause severe contamination of the reactor water introducing a number of serious problems.

Failed fuel can be detected early, and the usual practice after determination of the defective fuel assembly is to replace the entire assembled unit with a new fuel assembly and to return the defective fuel assembly to a fuel reprocessing plant. This approach is inefficient and also introduces problems. The inefficiency results from the fact that an entire fuel assembly containing say 49 fuel rods is shipped to a fuel reprocessor even though 47 or 48 of the fuel rods are operative. Moreover difficulties are experienced in the shipping operation due to possible overheating of the cask-enclosed fuel assembly.

Other problems experienced with conventional fuel assemblies stem from the mechanically poor design of the assembly which utilizes the fuel rods as load bearing members, and the poor hydrostatic design which among other things locates mechanical pars at the upper end of the fuel assembly hindering the water flow through the assemblies.

Further problems are also experienced with the grapples employed in the prior art to remove fuel assemblies from reactor cores.

In addition thereto, the efficiency of the use of the nuclear fuel is related to the homogeniety potential of the core of the reactor and the ability to change frequently the core configuration. The core configuration is changed by the replacement of the fuel assemblies and the repositioning or shuffling of the fuel assemblies. The efficiency of the use of the nuclear fuel is also related to the ability to keep contaminates from accumulating or being present on the hot surface of the fuel elements. The accumulation of contaminates on the hot surface of the fuel elements reduces the coefficient of heat transfer, increases the operating temperatures of the fuel cladding, and tends to reduce the life of the fuel elements.

An object of the invention is a novel fuel assembly providing one or more of the of the following features:
  a. a mechanically sturdy construction in which the fuel rods are not load bearing elements;
  b. a construction that can be readily disassembled at the reactor site to replace failed fuel elements;
  c. a construction providing improved water flow resulting in reduced pressure drop through the fuel assembly;
  d. a construction that improves the sealing to neighboring units enhancing water flow through rather than around the fuel assemblies; and
  e. a construction that can be readily and rapidly lifted out and removed from or inserted back into the reactor core.

Another object of the invention is a novel fuel rod that will sturdily mount within the fuel assembly but can be individually removed if desired and secured within a transport casing for shipment to a fuel reprocessor.

Still a further object of the invention is a novel grapple of the stiff type that will readily engage the novel fuel assembly, that can be solidly locked thereto for the purpose of lifting same with reduced risk of accidental disengagement and dropping of the fuel assembly during a refueling operation, and that can be manually operated in case of accidental jamming.

These and further objects and advantages of the invention as will appear hereinafter are obtained with a fuel assembly comprising an outer channel member or housing having secured to its walls on its interior a plurality of fuel spacer elements forming a sturdy integral unit. At the bottom end of the housing is secured a lower mounting plate, and at the upper end of the housing is removably secured an upper mounting plate. The fuel rods for mounting within the fuel assembly comprise as is usual fissionable material pellets packed within a metal tube, but the tube ends are provided with threaded plugs which seat in appropriately configured openings in the lower and upper mounting plates while the tubes themselves pass freely through apertures in the spacer members. The upper wall of the housing is provided with recesses to receive laterally extending pins on the lifting grapple.

This consturction, which will be elaborated on in the detailed description that follows, provides for ready lifting of the fuel assembly by a stiff grapple out of the reactor core, and ready removal by a similar grapple of the upper mounting plate, thereby permitting individual removal of each of the fuel rods from the fuel assembly by a special tool, in a complete on-site reactor operation.

The grapple of the invention is constructed to mate with the fuel assembly in only those positions where it can be locked to the fuel assembly by a rotating action causing outward lateral movement of the grapple pins into the assembly wall recesses. A further feature provides for in situ disassembly from above of the grapple should it accidentally jam during an assembly lifting operation.

All the fuel elements of the assembly are similar in construction for standardization so that they can occupy any vertical position in the fuel assembly. Further, each fuel element is constructed to be individually removed, so it can be cleaned, inspected, measured for power distribution and isotopic concentration, and replaced or returned to the reactor core for improved efficiency of the use of the nuclear fuel. The removal and replacement of the respective fuel elements is accomplished by a threaded tool. Thus, the fuel elements can be handled separate and apart from the fuel assembly for fabrication, radiation measurements, shipping, handling and processing.

The housing for the fuel assembly is formed with recesses that are received by pins of the grapple for raising the fuel assembly, and a grapple tool is also used to engage the resiliently mounted upper mounting plate in the housing for removing the same. Thus, the pressure drop of the coolant flow across the housing is not increased by the presence of mechanical equipment in the housing for retaining and centering the fuel elements.

By being able to remove fuel elements individually from the fuel assembly for shipment to a fuel processor, only the defective fuel elements are transported. Each fuel element is disposed within an individual case for shipment. Hence, the shipment of radioactive parts from the site of the reactor power plant is kept at a minimum. Also, the tendency for the fuel element to melt during shipment is reduced because the fuel element confronts a cold transfer case and not another fuel element. Thus, the radioactive area has been reduced and the capacity to withstand heat has been increased. Other features of the invention will be described hereinafter.

The invention will now be described in greater detail with reference to the accompanying drawings, wherein.

Figure 1:
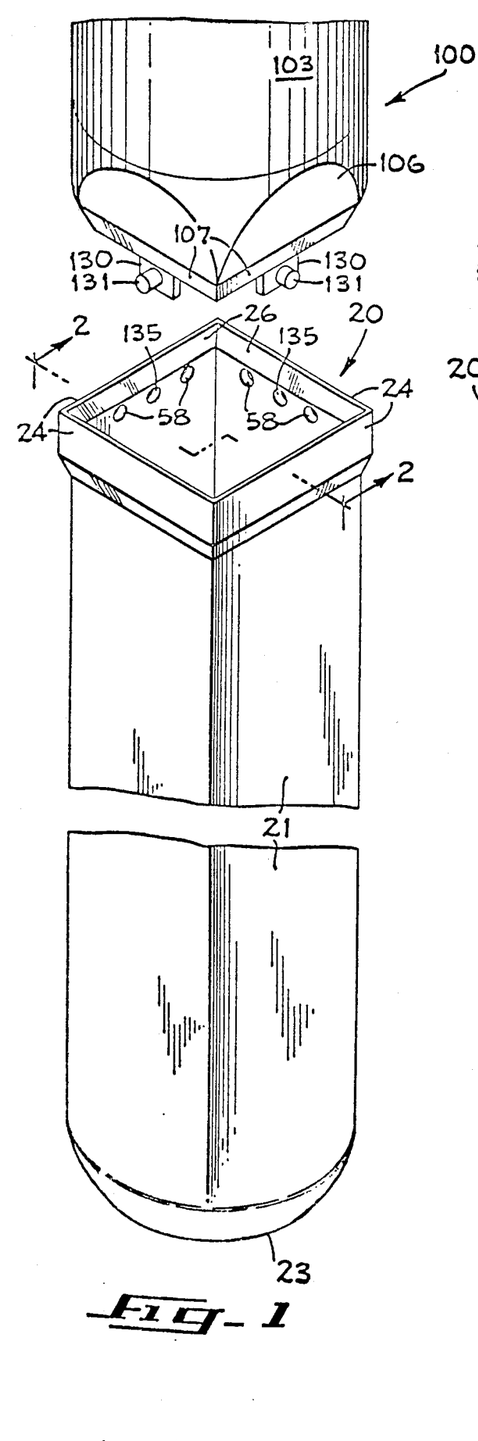
FIG. 1 is a perspective view of one form of fuel assembly especially adapted for a boiling water reactor nuclear power plant embodying the present invention, illustrated in conjunction with a portion of the lifting grapple.
Figure 2:
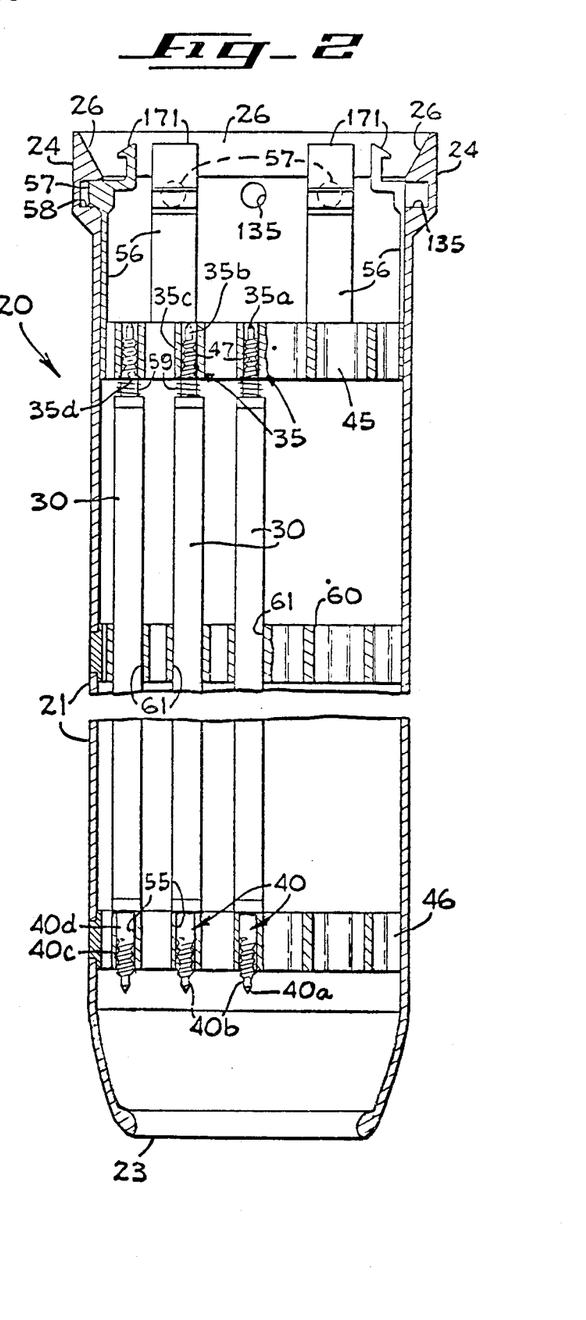
FIG. 2 is a vertical section view of the fuel assembly shown in FIG. 1 taken along line 2—2 of FIG. 1.
Figure 4:
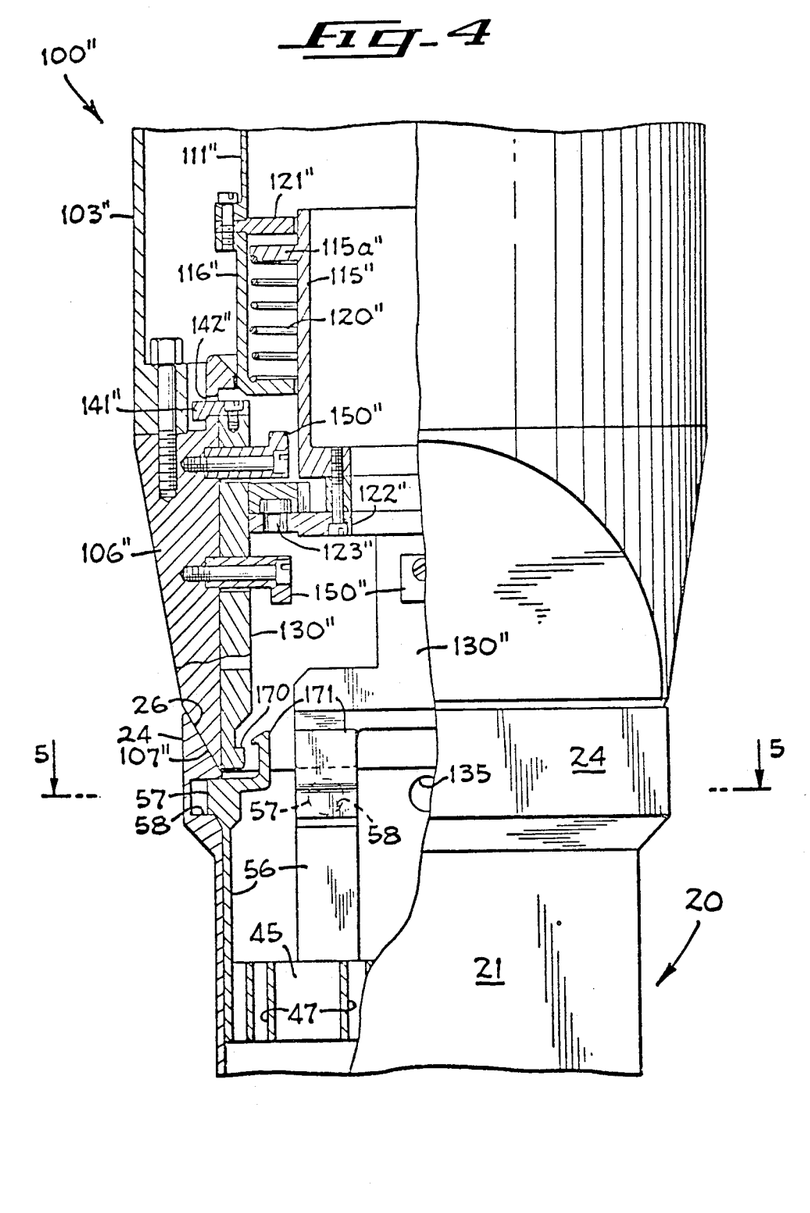
FIG. 4 is a fragmentary diagrammatic front elevation view partially in section of one form of lifting grapple for removing an upper detachable mounting plate in the housing which supports the upper portion of the fuel elements.

Illustrated in FIGS. 1 and 2 is one form of nuclear fuel assembly 20 of the present invention which comprises a housing or channel 21 having a generally square cross-sectional area and which is especially adapted for use in a boiling water reactor. The lower end of the housing 23 has a generally round configuration. The lower end of the housing 23 is fixed to the upper end of the housing by welding or the like forming a solid walled unitary structure. The upper end of the housing is open and comprises flanged walls 24. The walls 24 have downwardly and inwardly directed surfaces 26 (FIGS. 1, 2 and 4). The configuration of the upper end of the housing 21 is shaped to guide a lifting grapple to be described hereinafter to its proper grappling position relative to the housing 21. While the configuration illustrated is square, it can also be slightly rectangular, so that when four of the assemblies are grouped together as is usual, sufficient space will be provided between adjacent wall surfaces to receive the usual cruciform control element.

Disposed within the housing 21 is an array of elongated, parallel, spaced fuel elements 30 (FIG. 2) of suitable fissionable material. The fuel elements are also referred to as fuel rods or pins and may comprise as is known a metal tube made of zirconium or a zirconium alloy and filled with $UO_2$ pellets. The fuel elements 30 are vertically disposed within the housing 21. Coolant such as light water flows vertically through the housing 21 among the spaced fuel elements 30. As is conventional in the boiling water reactor, the nuclear fuel core contains a plurality of such fuel assemblies 20 arranged side by side. It is preferred that all of the fuel assemblies 20 within the core are identically configured.

Figure 7:
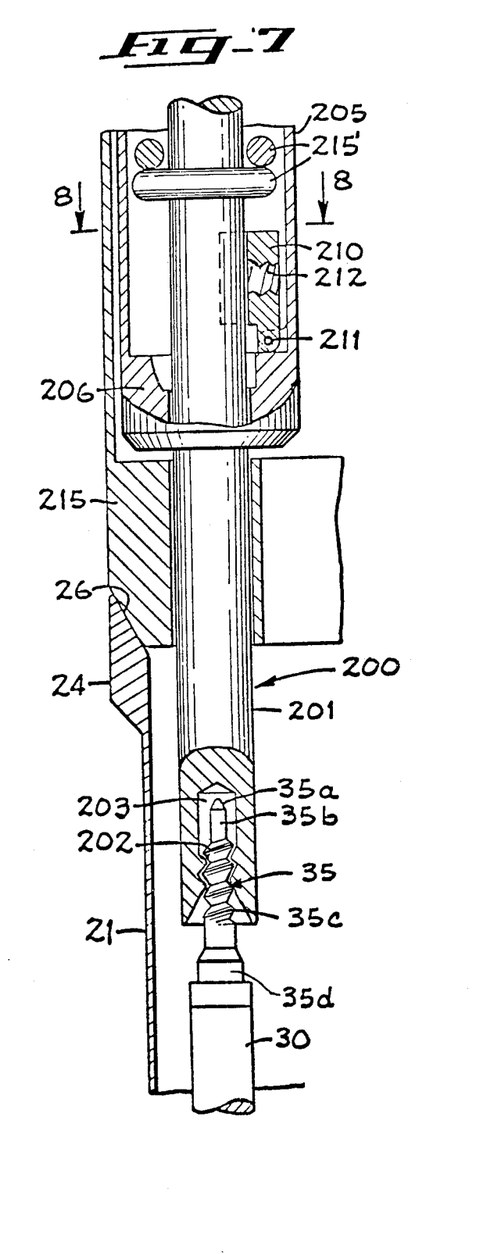
FIG. 7 is a diagrammatic longitudinal sectional view of one form of threaded tool and transport device for removing and transferring a fuel element shown in conjunction with a fragmentary view of the fuel assembly and fuel element.
Figure 8:
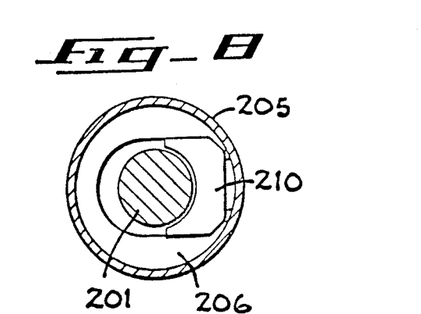
FIG. 8 is a horizontal sectional view taken along line 8—8 of FIG. 7 of the threaded removal tool and fuel element transport device shown in FIG. 7.
Figure 9:
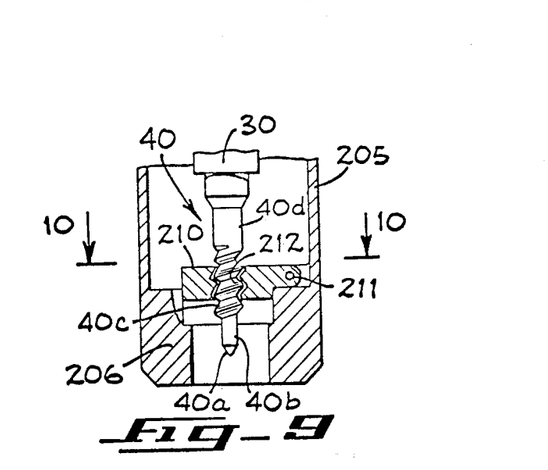
FIG. 9 is a fragmentary longitudinal section of the fuel element transfer device shown in a latch position.
Figure 10:
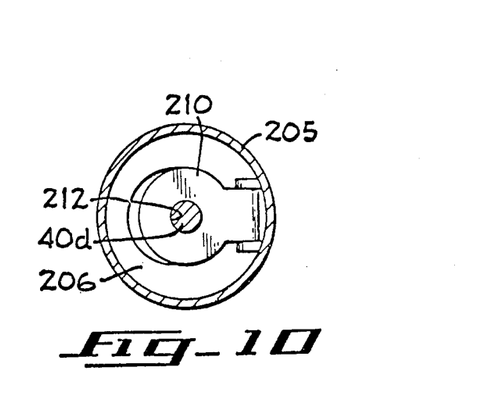
FIG. 10 is a plan horizontal sectional view of the transfer device shown in FIG. 7 taken along line 10—10 of FIG. 9.

At the upper end of each fuel element 30 is fixed an upper mounting plug 35 which seals off the upper end of the associated fuel element 30. Each of the mounting plugs 35 is formed with a generally conical tip 35a which continues into a cylindrical portion 35b and from thence into a wide or coarse threaded section 35c of the mounting plug 35 which terminates at a cylindrical portion 35d. The threaded section 35c comprises a series of adjacent frusta conical surfaces. Fixed to the lower end of each fuel element is a lower mounting plug 40, which is similar in construction to the upper mounting plug 35. Each of the lower mounting plugs 40 is formed with a conical end portion 40a which continues into a cylindrical section 40b. The cylindrical section 40b of the mounting plug 40 joins a wide or coarse threaded section 40c. The threaded section 40c comprises a series of adjacent frusta conical surfaces which terminates in a cylindrical portion 40d. In a manner to be described hereinafter, a threaded tool (FIG. 7) may be used to grip in threaded engagement the upper plug 35 for removing and transferring the fuel element or installing a new fuel element in the assembly 20, and a latch may be provided in a casing used for shipment of defective or spent fuel elements to a fuel reprocessor, said latch being adapted to threadingly engage the lower mounting plug of the fuel element. When the upper 35 and lower 40 mounting plugs are identical, it also allows end-to-end reversal of the fuel elements as part of a refueling program.

Figure 5:
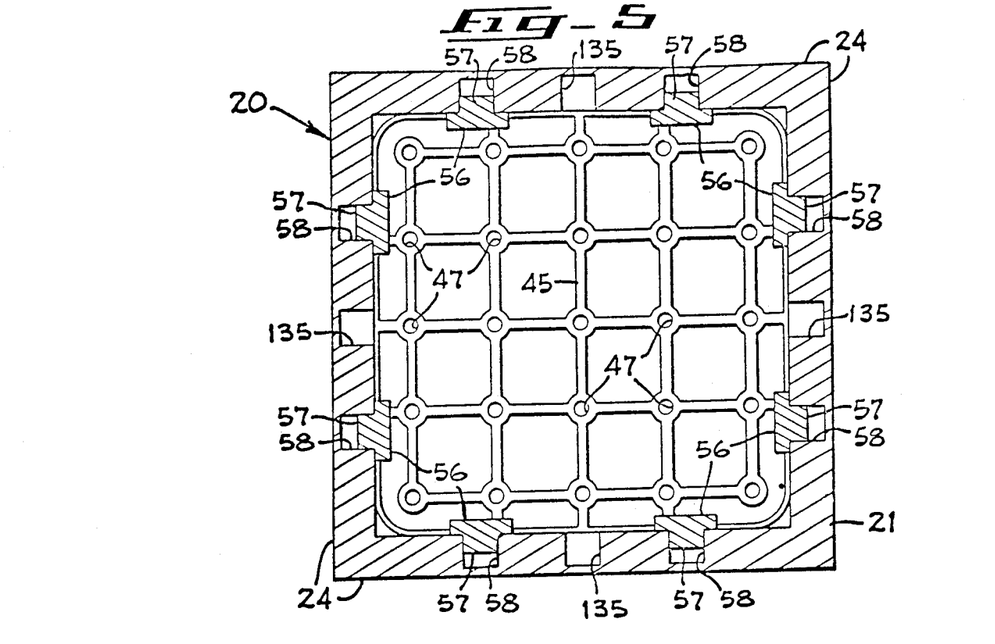
FIG. 5 is a horizontal sectional view taken along line 5—5 of FIG. 4 to illustrate the removable upper mounting plate for removably retaining the fuel elements in the fuel assembly.

For supporting the fuel elements 30 within the housing 21, are a pair of horizontally disposed, vertically spaced mounting plates 45 and 46 (FIGS. 2 and 5). The upper mounting plate 45 (FIG. 5) is formed with a plurality of parallel rows of openings 47. There is one opening 47 for each fuel element 30. Each upper plug 35 is received by its associated opening 47. The upper mounting plate 45 is detachably secured to the walls of the housing 21 and is removable from the housing 21. For this purpose, leaf spring arms 56 are fixed each at its bottom end to the mounting plate 45 (FIGS. 2 and 5) and at its upper end include a cylindrical pad or projection 57 that seats in recesses 58, respectively. The recesses 58 are formed in the walls 24 of the housing 21 but do not extend therethrough. By urging the projections 57 laterally inward a sufficient distance to clear the walls 24 of the housing 21, a grapple tool (FIG. 4) to be described hereinafter can be employed to remove the upper mounting plate 45 from the housing 21 by raising the same through the upper open end of the housing 21.

The lower mounting plate 46 is formed with a plurality of parallel rows of openings 55 and is generally similar in appearance to the upper spacer 45 (FIG. 5). There is one opening 55 for each fuel element 30. Each lower plug 40 is received by its associated opening 55. The lower mounting plate 45 is however fixed to the housing 21 by suitable means, such as welding, brazing or the like.

For maintaining each fuel element 30 relatively stable relative to the mounting plates 45 and 46, each upper plug 35 is surrounded by a helical spring 59 (FIG. 2) that is anchored to the lower end of the removable spacer 45 so as to surround the opening 47 associated therewith and bears against the fuel element wall. The spring 59 urges its associated fuel element 30 to be stable in its prescribed position and allows for thermal expansion of the element. In the alternative, the lower plugs 40 of the fuel elements 30 may be detachably held by the lower mounting plate 46 through the yieldable action of an associated plunger spring.

Intermediate the upper mounting plate 45 and the lower mounting plate 46 is at least one centering or spacer plate 60. For a typical fuel assembly about ten such spacers would be provided typically 10–18 inches apart. The spacers 60 are each formed with a plurality of parallel rows of openings 61. There is one opening 61 for each fuel element 30. Each fuel element 30 is received by its associated opening 61 through which it freely passes. Each of the spacers 60 is secured to the walls of the housing by means of welding, brazing, or the like, similarly to the lower mounting plate 46.

Figure 3:
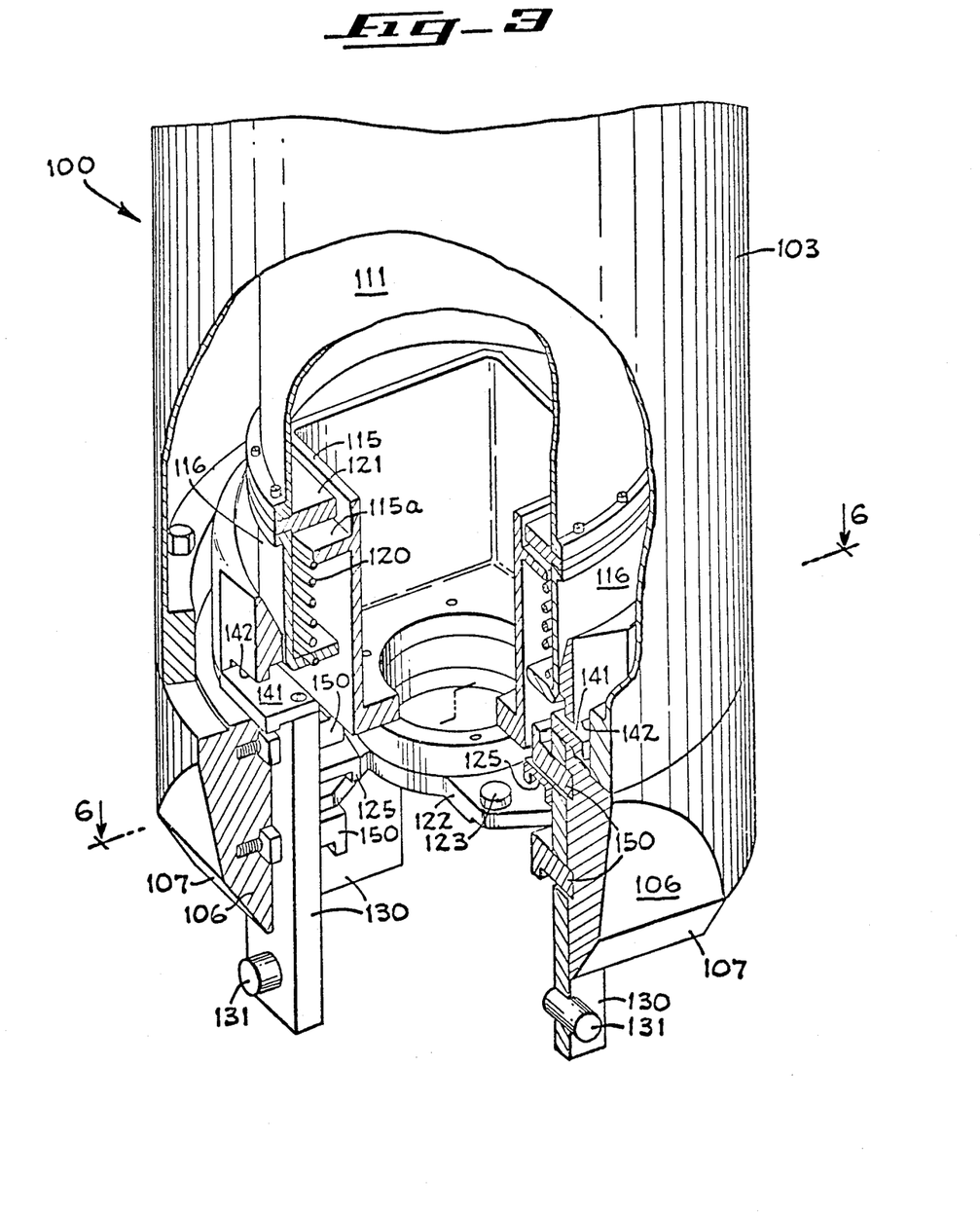
FIG. 3 is a fragmentary perspective view of the movable portion of one form of lifting grapple for raising and lowering the fuel assembly shown in FIGS. 1 and 2.
Figure 6:
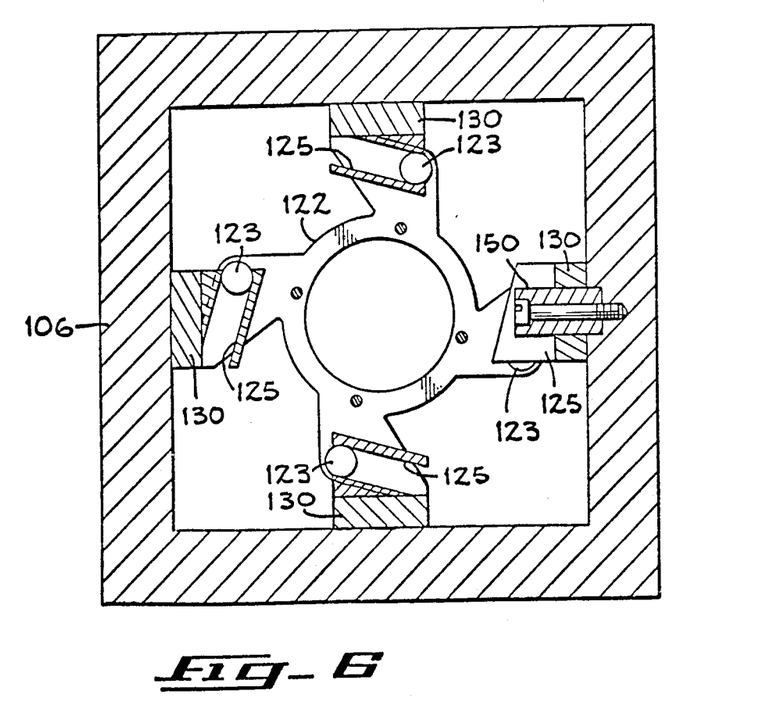
FIG. 6 is a horizontal section view taken along line 6—6 of FIG. 3 to illustrate the arrangement for actuating the assembly lifting apparatus into and out of engagement with the fuel assembly.
Figure 11:
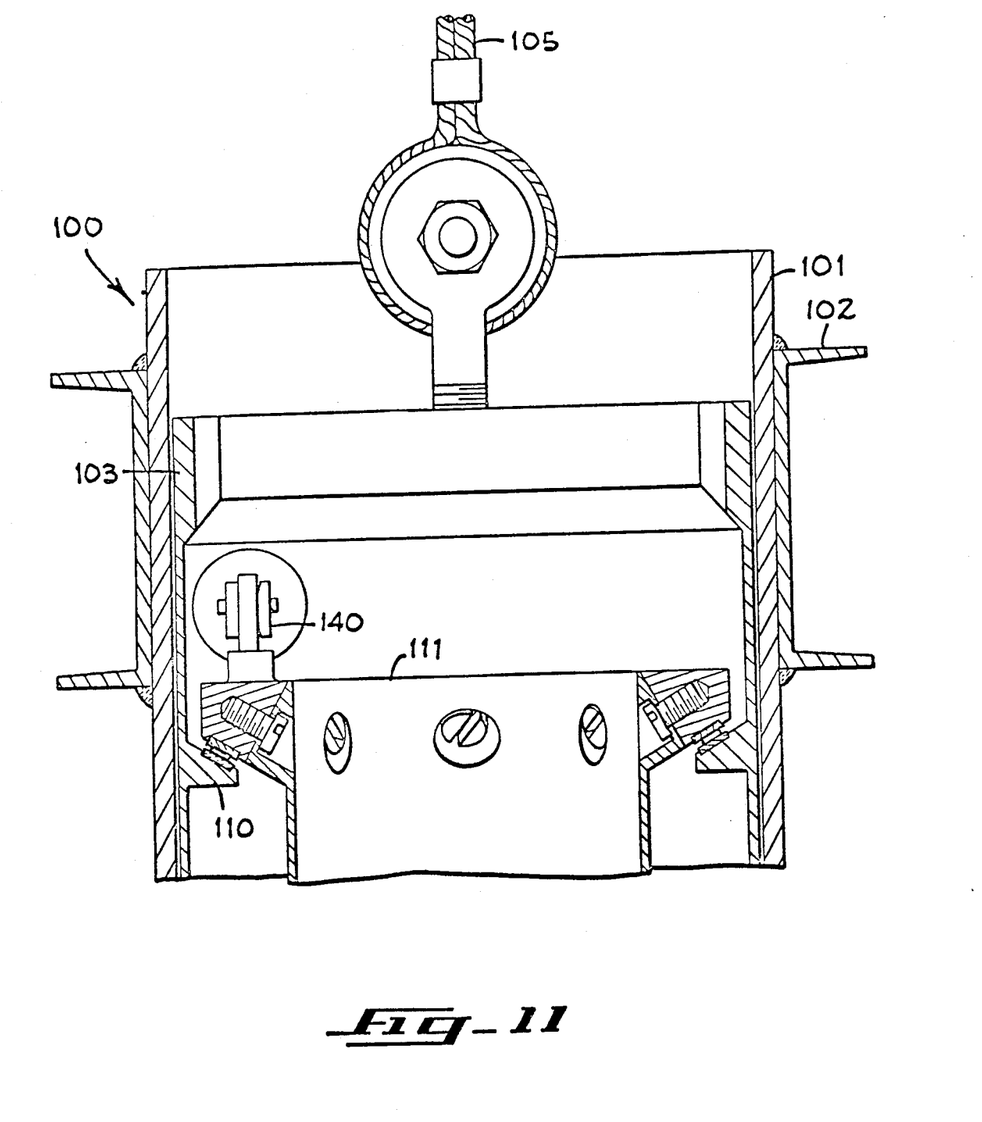
FIG. 11 is a diagrammatic sectional view of the upper portion of the fuel assembly lifting grapple illustrated in FIG. 3 in conjunction with a hoist cable and refueling platform guide.

For raising and lowering the fuel assembly 20 within a reactor vessel, not shown, and more particularly within the fuel core thereof, in order to replace same with a fresh assembly or for shuffling purposes to enhance performance, an assembly lifting apparatus or grapple 100 embodying the present invention is provided, as is illustrated in FIGS. 3, 6 and 11.

The assembly gripping apparatus 100 is disposed within a rigid cylindrical guide tube 101 (FIG. 11) that is fixed to a beam 102 of a well-known and conventional refueling platform superstructure. The assembly gripping apparatus 100 comprises a lifting cylindrical tube 103 (FIGS. 3 and 11) which is raised and lowered within the guide tube 101 by a conventional hoist supported by the refueling platform superstructure. For this purpose, a cable 105 (FIG. 11) is clamped to the lifting tube 103 in a conventional manner. Fixed to the lower portion of the lifting tube 103 is a seating guide 106 (FIG. 3) of a quadrature configuration with inwardly tapered walls 107 to mate with the inner tapered surfaces 26 of the flanged walls 24 of the assembly housing 21 to seat and guide the assembly gripping apparatus 100 relative to the fuel assembly 20 to be raised.

Formed on the inner wall of the lifting tube 103 is a flange 110 (FIG. 11). Supported for rotary movement by the flange 110 is a cylindrical actuating tube 111 (FIGS. 3 and 11) which extends downwardly within the lifting tube 103. Bolted to the lower end of the actuating tube 111 for rotation therewith is a cylindrical housing 116 (FIG. 3). Disposed within the actuating tube 111 is a rotatable quadrature member 115. Interposed between a flange 115a of the quadrature member 115 and the bottom wall of the housing 116 is a coil spring 120. The quadrature member 115 is yieldably supported by the coil spring 120 within the actuating tube 111 and the raising and lowering of the actuating tube 111 moves the quadrature member 115 therewith.

Projecting inwardly from the actuating tube 111 is a quadrature flange 121, which surrounds the quadrature member 115. Rotation of the actuating tube 111 imparts rotation to the quadrature member 115 through the flange 121. Depending from the quadrature member 115 for rotation therewith is a cam plate 122 (FIGS. 3 and 6). A plurality of upstanding cam pins 123 (FIG. 6), such as four, are supported by the cam 122 for rotation therewith. A plurality of cam followers 125 (FIGS. 3 and 6) receive the pins 123, respectively, and are moved thereby laterally in a horizontal plane in response to the rotation of the cam 122.

Fixed to the cam followers 125, respectively, for movement therewith are a plurality of vertically disposed lifting plates or fingers 130. There are four lifting plates or fingers 130 in the preferred embodiment, arranged as two pairs of confronting, parallel plates or fingers 130. By rotating the quadrature member 115, the cam followers 125 move in a horizontal plane to move confronting parallel lifting plates or fingers 130 laterally toward or away from one another.

The lifting plates 130 are slideably supported each on two square guide rods 150 which are bolted to the guide 106. the inner ends of the guide rods 150 are flanged to stop further inward movement of the lifting plates 130. At the lower end of the lifting plates 130 are outwardly projecting pins 131, respectively. The pins 131 are horizontally disposed pins and are adapted to be received by recesses 135 (FIGS. 1, 2 and 5) formed in the opposing flanged walls 24 of the housing 21.

In operation, to raise the fuel assembly 20, the cable 105 lowers the lifting tube 103 into the guide tube 101 until the tapered walls 107 (FIG. 4) of the seating guide 106 mate with the tapered surfaces 26 of the wall 24 of the fuel assembly housing 21. At this time, the lifting plates 130 are disposed inwardly or toward the center to reduce the space therebetween. An hydraulic linkage such as an air cylinder 140 (FIG. 11) connected between the actuator tube 111 and the lifting tube 103 is then actuated, which rotates the actuator tube 111 about its vertical axis (clockwise direction of FIG. 6). This action serves to rotate the quadrature member 115 causing the cam 122 and the cam pins 123 to rotate therewith. Thereupon, the cam followers 125 and the lifting plates 130 move outwardly so that the pins 131 of the plates 130 are caused to enter the openings 135 of the fuel assembly housing 21 to grip the fuel assembly housing 21 for lifting the same.

At the upper end of the lifting plates 130 are secured safety locks 141 respectively, (similar to the safety locks 141'' shown in section in FIG. 4) which are received by openings 142 formed in the seating guide 106 when the pins 131 of the lifting plates 130 enter the openings 135 of the fuel assembly housing 21. When the fuel assembly 20 is initially elevated, the locks 141 are pulled down, illustrated in FIG. 4, preventing inward movement of the lifting plates 130 and disengagement of the grapple from the fuel assembly. When the fuel assembly housing 21 is returned to its position in the reactor core, or placed in a storage rack or the like, the tapered wall 107 of the seating guide 106 still being in flush engagement with the tapered wall 26 of the fuel assembly housing 21, the weight of the fuel assembly 20 is removed from the lifting apparatus 100. As a result, the unloaded coil spring 120 raises the quadrature member 115 slightly to raise the lifting plates 130 via the pins 123 and follower 125. This action causes the safety locks 141 to be slightly lifted releasing them and enabling them to be removed from the openings 142 of the seating guide 106. Then, the air cylinder hydraulic linkage 140 can be actuated to rotate the actuating tube 111 in the opposite direction, which also rotates the quadrature member 115. Thereupon, the cam 122 and the cam pins 123 rotate (counterclockwise in FIG. 6) to move the cam followers 125 inwardly. This results in the retraction of the lifting plates 130 which removes the pins 131 from the openings 135 and removes the locks 141 from the openings 142. The stops on the ends of the guide rods 150 (FIGS. 3 and 6) fixed to the seating guide 106 limit the inward movement of the plates 130.

While the grapple is lifting the fuel assembly 20, it is supported through the following parts; pins 131, lifting plates 130, guides 150, seating guide 106, lifting tube 103, and the hoist cable 105. Once the fuel assembly 20 is lifted and the load thereof is applied to the lifting plates 130, the actuating tube 111 is isolated from the load and the cam 122 is prevented from rotating, since the lifting plates 130 and the cam followers 125 are inhibited by the locks 141 for movement. Inadvertent actuation of the lifting apparatus 100 will not release the fuel assembly 20 once it is gripped. As a matter of fact, with the fuel assembly gripped, an operator can depress with the fuel assembly gripped, an operator can depress tube 115, lowering the cam pins 123 below their followers 125, and rotate the same to dislodge and completely remove the cam 122, for example for servicing same. Thereupon, the cam 122, the pin 123, the housing 115, the spring 120 and the housing 111 can be removed vertically from the lifting tube 103. In case of undesired jamming of the grapple 100, a tool can be inserted into the cavity to pry the lifting plates 130 away from the recess 135 in the housing 21 to get access to the reactor core. Further, if required, the bolts securing the seating guide 106 to the lifting tube 103 can be removed from the top and the lifting tube 103 removed, providing direct access to parts 130, 150, 106, 141, and 125.

Figure 12:
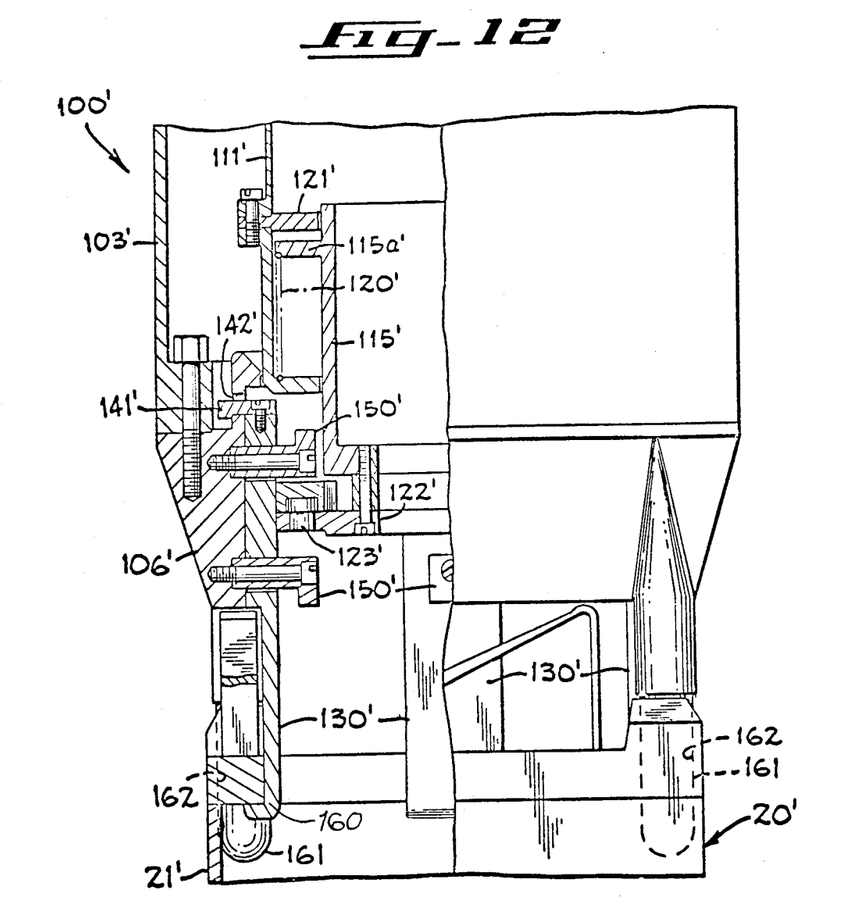
FIG. 12 is a diagrammatic fragmentary elevation view partially in section of a modification of the assembly lifting grapple especially adapted for use with a fuel assembly for a pressurized water reactor.

Illustrated in FIG. 12 is a fuel assembly lifting apparatus 100', which is a modification of the fuel assembly lifting apparatus 100. The modified apparatus is adapted for gripping and lifting a conventional fuel assembly 20' for a pressurized water reactor. The parts of the lifting apparatus 100 that are similar in construction and operation to the parts of the lifting apparatus 100 have been designated with the same reference numerals accompanied by a prime suffix.

In the fuel assembly lifting apparatus 100', the lifting plates 130' have hooks 160 at the distal ends thereof to engage an inwardly projecting flange present in the fuel assembly housing 20' in lieu of pins received by openings in the housing. Also, guide legs 161 extending downwardly from the guide seat 106' are received by vertical disposed openings 162 formed in the assembly housing 21' to guide the apparatus 100' into proper seating relation relative to the fuel assembly housing 20'.

Illustrated in FIG. 4 is a modified grapple 100'' for removing the upper mounting plate 45 from the fuel assembly housing 21. The grapple 100'' is similar to the grapple 100 in construction and operation with the exception that hooks 170 are mounted on the lifting plates 130 in lieu of the projections 131. The parts of the grapple 100'' corresponding with the parts of the grapple 100 are shown with the same reference numerals but with a double prime suffix. The upper plate 45 is provided with hooks 171 (FIGS. 2 and 4) on the leaf springs 56 that mate with the hooks 170 of the grapple 100''. More specifically, the distal ends of each of the leaf springs 56 includes a hook 171 that is directed in a direction opposite from the direction in which the associated projection 57 is directed.

When the lifting plates 130'' are retracted inwardly by the cam followers 125'', each hook 170 on each of the four lifting plate 130 engages two hooks 171 on adjacent leaf springs 56 to remove the pins 57 from the recesses 58 to separate the plate 45 from the fuel assembly 20. The cable, such as the cable 105 in FIG. 11, raises the lifting tube 103'' to lift the plate 45 from the assembly 20 and out of the reactor core.

After the upper mounting plate 45 is removed from the housing 21, a special tool 200 (FIGS. 7–10) is provided for gripping a fuel element 30 selected to be removed individually and applies a lifting force thereto. The tool 200 comprises a vertically movable and rotatable shaft 201. The free lower end of the shaft 201 comprises a threaded wall 202 surrounding an opening 203. The threaded portion of the wall 202 has a configuration generally similar to the threaded section 35c of the plug 35 and of a dimension sufficient to permit threaded engagement and yet large enough to compensate for expansions and the collection of foreign matter without causing unwanted locking. The upper plug 35 of the fuel element 30 to be removed enters the opening 203 so that the threaded wall 202 upon rotation engages in threaded engagement the threaded portion 35c of the upper plug 35. Now, the shaft 201 of the removal tool 200 is raised vertically by a suitable hydraulic lift, not shown, conventionally mounted on the refueling platform for lifting equipment grapples.

At the outset of removing the fuel element 30 from the fuel assembly 20, the shaft 201 has its upper end above the upper end of a guide 215 and its lower end extending beyond the threaded portion 35c of the upper end plug 35. Above the guide 215 is disposed a cylindrical fuel casing 205 that has its axis aligned with the axis of the shaft 201. The length of the fuel casing 205 is sufficient to fully enclose the fuel element 30. Within the housing 205 is an annular flange 206 for guiding the movement of the shaft 201 within the housing 205 and to hold the fuel element 30 snugly within the fuel casing 205. Mounted on the flange 206 is a latch 210 that is pivoted about a pivot pin 211 and has a threaded opening 212. Above the latch 210 are suitable plural guides and retainers 215', secured to the casing wall 205, for guiding the movement of the fuel element 30 in the housing 205 and for retaining in a fixed position the upper portion of the fuel element 30 while in the housing 205.

The shaft 201 is raised to remove the defective fuel element 30 from the fuel assembly 20. The shaft 201 continues to be lifted until the defective fuel element 30 is contained by the transfer casing 205. Initially, the latch 210 is raised to the vertical position (FIGS. 7 and 8) and the shaft 201 and the defective fuel element 30 are raised beyond the latch 210. Then the latch 210 is pivoted under the force of gravity to the horizontal position (FIGS. 9 and 10) and the lower end plug 40 of the defective fuel element 30 is secured by threaded engagement to the latch 210 in the housing 205. The upper end of the defective fuel element 30 is retained in the housing 205 by the guides 215'. The removal tool 200 is disengaged from the defective fuel element 30 when the defective fuel element 30 is encased in the casing 205. The defective fuel element 30 can then be shipped individually to and from the fuel reprocessor while encased in the transfer casing 205.

As will be observed from the foregoing description, the novel fuel assembly offers the following features. A sturdy construction is provided comprising an integral housing or channel 21 reinforced at spaced intervals throughout its length by the plural spacers 60 and lower mounting plate 46 which are solidly anchored to the channel wall throughout their periphery. This allows the use of a thinner housing wall without fear of bowing due to pressure differences, providing increased coolant flow and increased power. With the channel thus serving as the main load bearing member, it can be enlarged to house a greater number of fuel elements, thus reducing the number of fuel assemblies for the same number of fuel pins. In addition, when the plural fuel assemblies are seated in the reactor core, the outwardly projecting upper flanged walls 24 may engage one another or the upper core grid plate or at least be closely adjacent one another. This close spacing forms an obstruction which hinders coolant flow between the channels 21 causing more of the coolant flow through the channels and increasing heat transfer to the coolant. A typical arrangement of the fuel assemblies in the core grid is illustrated in FIG. 1 of my copending application Ser. No. 188,151, filed Oct. 12, 1971, which also describes ways of detecting leaking fuel rods using a modified form of the grapple described herein.

Further, the upper mounting plate 45 can be removed by the grapple while the fuel assembly is within the core or stored in the fuel storage pool. With the upper mounting plate removed, access is had to each of the fuel rods or elements 30 and any one or more that may have sprung a leak can be individually removed and replaced by a safe element. As the upper mounting plate 45 is lowered back into place, the leaf spring projections 57 will ride down the inclined surfaces 26 and snap into place within the recesses 58 when the mounting plate reaches its correct position. The ease with which defective individual fuel elements can be replaced will enable more rapid removal of leaking elements preventing the build-up of excessive contamination in the reactor vessel due to failed fuel and avoids all of the attendant problems of decontamination, leading to reduced operating expense.

The grapple which is adapted to cooperate with the novel fuel assembly offers the following features. It is a stiff system and thus can be accurately positioned over the desired fuel assembly by accurate positioning of the supporting refueling platform superstructure. This lends itself to automatic computer-aided positioning of the grapple in order to speed up reactor refuelling, allowing for more frequent refueling and thus improved homogenization. A number of safety features are incorporated to ensure solid locking of the grapple to the fuel assembly and prevent an accidental drop. For example, once the grapple has engaged the fuel assembly and is loaded, lock 141–142 is actuated preventing disengagement of the grapple until the fuel assembly load is removed. Further, suitable electrical interlocks, not illustrated, can be provided which will prevent lifting of the grapple until the pins 131 are fully seated in the fuel assembly recesses 135. This can take the form, for example, of a microswitch which becomes actuated only after lock 141 has penetrated a suitable distance through aperture 142, which can only occur when supports 130 have made their full outward displacement. Should the pins 131 not be aligned with the recesses 135, then the full outward displacement will not be possible. Similarly, a microswitch can be provided for actuation by the elements 111 or 115 when fully rotated to release the fuel assembly. This will prevent lifting of the grapple before it is fully disengaged from the fuel assembly. In a similar vein, due to the generally square configuration of the fuel assembly top and the similar configuration of the grapple bottom, the two cannot mate unless they are properly aligned. The grapple is constructed as will be evident from the drawings so that it can be manually disassembled and manually actuated in case of accidental jamming. Thus, as described the quadrature tube 115 with attached cam plate 122 can be manually removed from the top, and the lifting tube 103 also removed, providing access to the remaining grapple parts.

The tool construction 200 described for removal of individual fuel pins offers the advantages that, similarly to the grapple, it is a stiff system which lends itself to automatic positioning, the fuel element after lifting becomes immediately enclosed in a sturdy casing 205 which prevents accidental falling or damage and affords good radiation protection, and the fuel pin can be rapidly and simply secured in position within the casing 205 by means of the gravity operated lower fitting 210.

The facility of replacing a leaking fuel element with a fresh fuel element of high activity in a bundle of otherwise satisfactory fuel elements of lower activity can introduce an additional problem, which will be clearer from the following explanation. It is desirable for most efficient reactor operation to minimize the peak-to-average power ratio. This suggests the use of fuel pins all of low enrichment, which however would require more frequent refuelling. The improved fuel assembly and grapple of the invention which will permit replacement in less time than prior art constructions will allow more frequent replacement and thus the use of lower enrichments. However repositioning of the conventional movable control element as the fuel activity diminishes still becomes necessary. Changing the position of the control element in accordance with the activity of adjacent fuel assemblies is not an efficient method to compensate for strongly varying degrees of enrichment. One solution proposed by the prior art was to mix into the fuel pin with the fissionable material a burnable poison which would burn up at about the same rate as the fuel activity diminishes, but this is expensive and hard to control for different enrichments. A similar problem is encountered when a defective fuel pin of low enrichment is to be replaced. Obtaining a replacement pin of equal activity will be difficult. Replacement with a fresh fuel pin of high enrichment would result in non-uniform heat generation within the fuel assembly, which may be undesirable. In view of the relative ease of replacement of fuel pins of the novel fuel assembly, in accordance with this feature of the invention, poison rods or elements can be provided within the fuel assembly mixed in with the fuel pins in order to render the heat generation more uniform. For this purpose, the poison rods would have the identical exterior configuration, except for if desired the upper fitting 35, to the fuel pins 30, making them completely interchangeable with the latter. Thus a poison rod can be substituted wherever a fuel rod 30 is located. Hence, in the case discussed above, when a fuel element of reduced activity is replaced with a fresh fuel element of high activity, then at the same time one or more of the adjacent fuel elements are replaced with fixed poison rods to compensate for the increased neutron generation from the more active fresh element.

The poison rods may be constructed in various ways to achieve the foregoing results. As one example, it can comprise a stainless steel tube enclosing a solid rod of neutron-absorbing material, such as boron or other well known poisoning materials. Preferably the poison material is also burnable. As another example, it can comprise a stainless steel tube with a hollow center (doughnut cross-section) with the tube walls filled with boron powder. Varying the tube wall thickness and thus the boron thickness would enable control of the poisoning effect. This would allow the reactor station to stock a variety of such poison rods of different poisoning effect for better matching to the replacement enrichment. Such rods would be relatively inexpensive to construct.

The possibility of including fixed poison rods within each fuel assembly provides an additional degree of freedom in choosing the activity configuration that will assist in establishing and maintaining the peak-to-average power ratio low. For example, each fuel assembly or larger bundle of fuel pins can be originally constituted of high enrichment fuel pins through which are uniformly scattered a number of burnable poison rods. As the fuel rod activity diminishes, so does the poisoning effect, affording more uniform heat generation during the bundle lifetime. A properly chosen enrichment and poison configuration would also allow the movable control elements to remain in a fully out position during the entire fuel cycle, which prevents the problem of control tip burnout and makes the heating more uniform. As mentioned above, the exterior shape of the poison rod should be identical to that of the fuel element 30, so that it is completely interchangeable therewith, except that it is preferred that the fitting 35 be different so that the same tool 200 used to remove the fuel element 30 could not be used to remove the poison rod, thereby avoiding any accidental confusion of the two elements. This is easily accomplished by providing a different thread on the upper fitting of the poison rod than that 35c present on the fuel rod 30. For example, if 35c is a right-hand thread, the poison rod thread can be left-handed, or of a different pitch not engageable by the thread 202 of the fuel pin removal tool 200. Thus a separate tool similar to that of 200 but with a threaded end matched to that of the poison rod would be provided for handling same. Instead of substituting poison rods with controlled degrees of poisoning for fuel elements, it will be also understood that the novel fuel assembly also permits leaving vacant the space normally occupied by a fuel element to increase the water to fuel ratio, or substituting, say, a solid similarly configured zirconium rod for a fuel element to reduce the volume of water present to provide still an additional degree of flexibility in achieving the optimum fuel-moderator-poison configuration.

While the principles of the invention have now been made clear in illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. A grapple for use with a nuclear reactor comprising an outer tube, depending lifting members mounted for horizontal sliding movement on the outer tube walls and extending within the outer tube, means mounted within the outer tube for rotary movement therein about the outer tube vertical axis, means connecting the means for rotary movement to the lifting members for converting the rotary motion into lateral movement of the lifting members, and means for inhibiting lateral movement of the lifting members whenever load is applied thereto.

2. A grapple as set forth in claim 1 wherein the means for rotary movement comprise an actuator tube, a non-circular tube within the actuator tube and rotatable thereby, and resilient means supporting the non-circular tube on the actuator tube.

3. A grapple as set forth in claim 2 wherein the connecting means comprise a horizontal cam plate mounted on the bottom of the non-circular tube, cam follower means secured to the lifting members, and means coupling the cam plate to the cam follower and causing lateral movement of the follower upon rotary motion of the cam plate.

4. A grapple as set forth in claim 2 wherein the inhibiting means are secured to the lifting members and adapted to engage and lock to the outer tube when load is applied, said resilient means being adapted to lift the lifting members and release the inhibiting means when the load is removed.

5. A grapple as set forth in claim 1 wherein the bottom of the outer tube is tapered.

6. A grapple as set forth in claim 1 wherein the lifting members have laterally extending projections.

7. A grapple as set forth in claim 1, in combination with a rigid, fixed guide tube, said grapple being vertically movable within the guide tube.

* * * * *